Jan. 22, 1929.
H. E. BUCKLEN
1,699,949
WIND DRIVEN GENERATOR
Filed Dec. 30, 1925
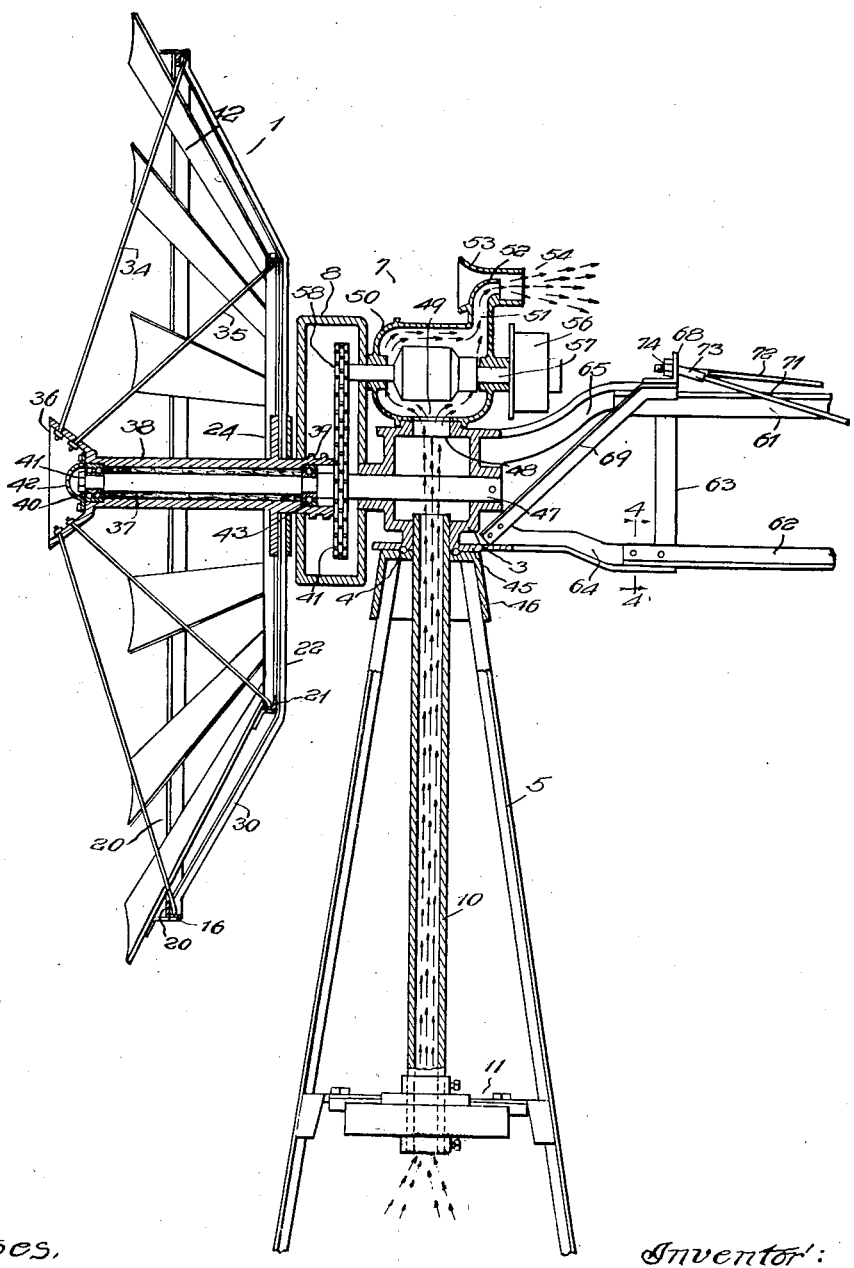

Patented Jan. 22, 1929.

1,699,949

UNITED STATES PATENT OFFICE.

HERBERT E. BUCKLEN, OF ELKHART, INDIANA.

WIND-DRIVEN GENERATOR.

Application filed December 30, 1925. Serial No. 78,274.

My invention relates to wind driven prime movers and more particularly to wind driven power plants for generating electric current. There are two general situations in which there is demand for wind driven power plants for generating electric current. First, remote stations where electric or other power is not available from commercial sources and expert attention is not available or is available at only infrequent intervals—second, where wind currents are strong and capable of producing considerable power relatively cheaply.

An instance of the former is found in lighting stations such as are required for beacons for aeroplane lanes and the like, or for light houses, buoys, or other markers. In such case the wind which is available may be relatively small in amount and fitful in action, but constant attendance by a trained engineer, as would be required by a gas engine plant, is not economically feasible.

An instance of the latter class is in the Western or Prairie States where persistent strong winds are available over the greater part of the year and much power is available if suitable means is provided to develop the same.

In a power developing plant of this character no difficulty is encountered in generating current when the wind is strong and continuous. Any kind of a wind mill will work at that time. But, for a practicable plant to continue to operate successfully the year around, the wind motor must be capable of useful operation to generate current upon momentary rise of the wind velocity to the cut-in speed. In other words, the wind motor must pick up useful load for momentary gusts, where such gusts rise in velocity to a value of say from five to eight miles per hour.

According to my invention I aim to keep the wind wheel in constant rotation, that is, spinning, even in a light breeze so that it is ready to respond to temporary increases of wind velocity to pick up useful load. To secure this desirable action, I mount the wheel upon a dead spindle through the medium of roller bearings so that it shall spin freely.

In order to make the generator weather proof, it is totally enclosed, but heretofore this has resulted in excessive heating and destruction of the insulation. According to my invention I provide a system of cooling which is responsive to wind velocity and hence to power generating, so that the greater the power generated, the greater will be the cooling effect.

The cooling system also carries out the carbon and copper dust which is produced by the wear of the brushes and commutator.

There are numerous other improvements which will be apparent from the following detail description of an embodiment of the invention.

Now, in order to acquaint those skilled in the art with one manner of constructing and operating a device embodying my invention, I shall describe in connection with the accompanying drawing a specific embodiment of the same.

The single figure of the drawing is a vertical cross section through the head of the generator of my invention.

As shown the generator of my invention comprises the frusto conical wheel 1 mounted upon a dead spindle 2 which in turn is supported upon a head member 3, this head member 3 being supported through the intermediary of a thrust bearing 4 provided with antifriction rollers upon the tower 5, which in the present case is shown as made of angle iron construction. The head casting 3 has a vane 6 connected to and suitably supported upon the head for directing the wheel 1 into the wind. An electric generator 7 is mounted upon the upper face of the head casting 3 and is connected through suitable gearing contained in a gear case 8, this gearing connecting the wheel 1 with the driving shaft of the generator 7.

The electric conductors leading from the generator 7 extend down through a conduit 10 which serves the purpose, first of conducting the electric conductors down to the umbrella 11, which contains suitable sliding contacts and collector rings, next a mechanical support having a radial bearing in the umbrella 11 to steady the head member upon the top of the tower 5, and finally the conduit 10 serves as a ventilating duct for the generator 7, as will be described later.

*Wheel construction.*

The wheel of my invention embodies a number of novel features primarily in the shape of the same and secondarily in the manner of constructing the same. The wheel 1 has a series of blades or vanes 12, in the present case twelve in number although this may be varied. In fact, I now contemplate the use of only two or three blades in order to reduce wind pressure when the wheel is set edgewise to the wind. The vanes instead of being disposed radially are disposed at an angle to the axis of the wheel. In the embodiment illustrated the angle is approximately 45°. This may be varied to secure maximum effect from a given wind velocity. These blades define in general the frustum of a cone, the larger end of which faces towards the wind and the smaller end of which is disposed near the head or mechanism of the machine. About half of the complete cone is cut away. These vanes 12 are in the machine illustrated formed of twenty gauge unannealed copperized sheet steel. This material is quite stiff and is resistant to the corrosive effect of weather. Preferably I bend over the lateral edges, for the dual purpose of finishing the edges so that they enter the wind more smoothly and for stiffening said edges and holding them straight. Upon the backs of these vanes or blades 12 I provide gussets or brackets 16 and 17, provided with ears such as shown at 18 and 19 for securing the gussets or brackets upon the backs of the blades 12 and suitably curved to conform to the cylindrical mounting surfaces of the angle iron rings 20 and 21 upon which said gussets or brackets 16 and 17 are secured, as by riveting.

The inner angle iron ring 21 is of smaller diameter and is set further towards the rear than the outer angle iron ring 20.

These rings 20 and 21 are supported upon a series of radial arms 22 made out of T-irons, these arms comprising a straight or radial portion 23, the inner end of which is clamped against a clamping flange 24 on the hub member 2, as by means of a suitable clamping plate 25 and bolts such as 26. At the outer end of the straight or radial portion 23 the two side flanges of the T-bars such as 22 are riveted as by the rivets 27 to the radial leg 28 of the angle iron ring 21. The cylindrical leg of the angle iron ring 21 is in turn riveted, as by means of the rivets 29 to the bracket or gusset 17 for the blade 12. The arm 22 has a diagonal portion which extends from the ring 21 to the outer ring 20, this diagonal portion 30 having its extreme end turned in to connect with the cylindrical leg 31 of the angle iron ring 20. The end of the diagonal portion 30 has a hook or axially extending portion 32 which lies against and is riveted to the cylindrical leg of the angle iron ring 20. The gusset 16 is riveted to the opposite side of said cylindrical leg 31.

The inner ring is preferably made of one by one by one-eighth inch angle iron and likewise the outer ring 20 is made of one by one by one-eighth inch angle iron in the form which I have shown. The spokes or radial arms 22 are preferably made of one and one-quarter by one and one quarter by three-sixteenths inch T-irons.

These arms or spokes 22 are too light alone to withstand bending by the thrust or pressure of the wind upon the vanes 12, but they are amply strong to take the inward radial thrust which is put upon them through the medium of the tension rods 34, 35. These tension rods 34 and 35 extend between the flared mouth 36 of the front end of the hub member 37 and the respective rings 20 and 21. The hub member 37 comprises a flared mouth or bell 36, the sleeve portion 38, the flange 24, and the tubular neck 40 to which the driving gear 41 is connected.

The tension rod 34 extends between the bell 36 and the outer angle iron ring 20 to support the pressure upon the outer ends of the blades 12. These tension rods 34 and 35 are preferably made of $\frac{5}{16}$ths inch nichrome steel in the particular embodiment herein described. They serve to anchor the blades 12 to the forward end of the hub and prevent bending stresses upon the spokes 22, these spokes 22 serving therefore substantially only in compression and to some degree tension. Not only do the rods 34 and 35 take the thrust of the wind, but they also hold the wheel against centrifugal force which tends to drive the blades 12 into a position more nearly radial. The wheel 1, being relatively large in diameter and rotating at high velocity, develops a very considerable amount of centrifugal force which must be held by these rods 34 and 35.

The wheel thus forms a truss structure. The rods 34, 35 are tension members and the spokes 23, 30 are compression or strut members. Obviously, the inward thrust of the outer ring 20 might be delivered to the hub 37 by a direct radial strut or spoke instead of transmitting it diagonally to the portion 23.

The wheel is mounted upon the dead spindle 2 of the head 3 through suitable roller bearings. In the preferred form of the invention which I have illustrated in Fig. 1, the outer roller bearings 40 comprises a double row of New-Departure ball bearings adapted to carry both radial and axial load, the inner ring of the bearing being suitably anchored by a shoulder upon the dead spindle 2 and a clamping nut 41 which hold said ring in place. Inside of the cup or bell 36 a cover 42 is bolted over the open end of the sleeve 38 to house the spindle 2. The interior of the hub 37 is filled with a suitable lubricant, preferably what is known in the market as "non-freeze non-fluid" oil.

A single row of ball bearings 43 designed to take both the thrust of the wheel 1 and support the radial inner load is mounted between a shoulder on the spindle 2 and the counter bore in the neck portion 39 of the hub 37.

Obviously, instead of ball bearings at 40 and 43 I may use Timken bearings, or any other suitable form of anti-friction bearings so long as the same support the wheel upon the spindle 2 for radial and axial load, so that it may spin freely.

The principles above disclosed are not to be limited to a multiblade wheel, but obviously may be applied to a two bladed wheel or propeller.

*The head member.*

The head member 3 forms the supporting connection between the wheel 1 and generator 7 and also the supporting connection between those two parts and the tower 5. The head casting 3 is in the form of a hollow box having a suitable flange 45 at its lower side connected by a neck with the main part of the casting 3, this flange 45 having a groove for the thrust bearing 4 which thrust bearing in the present case comprises a single row of ball bearings resting in a groove in the cap member 46, which cap member forms the top of the tower 5. The cap member 46 is in the shape of a hollow truncate rectangular pyramid, the tower 5 having four angle iron legs fitting into the corners of the cap 46. Obviously, this construction may be varied.

The head member 3 has a transverse passageway therethrough into which the enlarged end 47 of the spindle 2 is rigidly secured and pinned, this spindle 2 serving as before mentioned to support the wheel 1 and its connected gear 41.

The metal at the forward part of the head member 3 about the shaft 47 forms a boss upon which the gear case is clamped, this gear case being preferably split on the center line of said boss.

The head casting 3 has a vertical opening in the lower portion thereof within the ring of ball bearings 4, into which is secured the tube or conduit 10 which is preferably a piece of pipe cast into said head member 3 or otherwise rigidly secured thereinto.

The head casting 3 is open at its upper end to provide a port 48, which port communicates with a like port 49 in the bottom of the housing 50 of the generator 7. The generator 7 is clamped as by bolting firmly upon the top of the head casting 3, the two passageways or ports 48 and 49 being substantially in register, so that air may pass up freely through the conduit or pipe 10 to the interior of the hollow casting 3 and into the housing 50 of the generator 7. The upper end of the housing 50 of the generator 7 has a vertical passageway 51 which terminates in a rearwardly directed nozzle 52 inside of the venturi member 53, the open larger end of which faces in the same direction as the wheel 1, so that the same wind which operates on the wheel 1 to rotate it passing through the venturi member 53 draws air from the nozzle 52 and discharges it at the rear end 54 of the venturi 53 to set up an active circulation of air, as indicated by the arrows in Fig. 1. The venturi 53 may be only an inverted U-shaped hood extending over nozzle 52. The nozzle need not project into the throat of the venturi construction, it may be merely a port opening radially into the constriction.

This feature of using a wind operated ejector is a valuable improvement which may be employed independently of the particular manner of mounting and drive of the generator which I have shown. The air need not be drawn through the tube 10 and head casing 3 as it may be drawn, for example, through a suitable air inlet in the side or in the bottom of the generator housing. The ejector keeps the inside of the casing clean and prevents the accumulation of carbon dust from the brushes.

The casing 50 of the generator has a rearward extension 56 within which may be mounted a brake member for the shaft 57 of the generator 7 for the purpose of stopping the operation of the wheel 1 and generator 7 when desired.

The armature shaft 57 is connected to the hub of the wheel 1 through the intermediary of a gear 58 mounted upon said armature shaft 57, which gear 58 is connected to the gear 41, preferably by a chain connection. Obviously, instead of the two gears 41 and 58 being connected by a chain drive, they may be connected either directly by meshing the teeth thereof, or through the intermediary of one or more other gears, so that the speed of the armature shaft 57 is suitably increased with respect to the speed of the wheel 1.

The gears are suitably enclosed in the gear case 8 which is filled with a suitable lubricant to the desired extent to keep the device in condition for operation for long periods of time without attention. The shaft 57 of the motor 7 is preferably provided with anti-friction bearings so that lubrication does not become a limiting factor.

The tail vane of any desired construction may be suitably supported so as to govern the movements of the wheel, such as by a pair of angle iron bars 61 and 62 on each side of the vane.

*Operation.*

I shall now describe the operation of the system as a whole.

The wind wheel 1, which is of frusto conical shape, is adapted to be operated on very light winds, for example, from five to eight miles per hour to generate current usefully. It is desirable that the wheel 1 be arranged to spin readily and freely, so that advantage may be taken of temporary gusts of wind to accumulate electrical power in the storage battery. I find that it is highly desirable to permit a small amount of current to flow into the battery rather than to have the same charged by violent and intermittent current flow.

The wheel 1 is open at the center, the active vanes 12 extending only a relatively short distance in the radial dimension. I find that this improves the operation of a wind wheel of this character as it permits the air to pass through the same with less eddying and churning than would be the case if the vanes were extended to the center. In fact, I found by experiment that cutting the central part of the vanes away actually increases the power of the wheel. This appears to be due largely to the fact that the extension of the blades towards the center provides surfaces which move at relatively great differences in peripheral velocity and for practically all useful wind velocities the inner parts of the blades do not rotate at sufficient velocity to accomplish any useful purpose but serve merely as disturbing elements.

The angular position of the blades has the desirable result of keeping the wind from being thrown out radially by the rotating blades. Also this shape is highly desirable in providing clearance for the blades with respect to the tower.

The method of cooling which my invention provides is of great importance in generators of this class, as it permits continuous operation with a positive movement of the cooling medium. Obviously, a blower might be attached to the armature shaft, but I have found by experiment that the use of such a blower is undesirable as it absorbs the power which is developed by the wheel, and within the small confines of the generator housing insufficient peripheral velocity can be secured for the desired purpose. By the ejector scheme which my invention provides, no useful power is absorbed as the operation of the ejector is dependent upon the wind after it has passed the wheel 1. The vane always keeps the ejector headed into the wind so long as the generator is in operation.

The ejector is substantially weather proof or may readily be made so by extending the forward end sufficiently far as to prevent the deposit of sleet at any point where the same would tend to clog up the ejector. The relatively high velocity which is maintained at the point of greatest constriction is effective in keeping the same clear.

I do not intend to be limited to the details shown and described, as it is apparent that those skilled in the art will see ways of securing the advantages of my invention without adhering strictly to the details disclosed.

I claim:—

1. In a wind driven generator, the combination of a wind driven rotor, a mount for said rotor, a tail vane for said mount, a generator driven by said rotor, said generator having a cooling duct leading therefrom and an air inlet opening, said duct terminating in a nozzle, and a venturi mounted on said frame and having its intake facing in the same direction as the rotor, said nozzle discharging into said venturi.

2. In a wind driven generator, the combination of a head member, a rotatable driving rotor mounted on said head member, a generator mounted on said head member and having an air inlet opening, said generator being driven by said rotor, a cooling duct for said generator, and a wind operated ejector connected to said cooling duct to draw cooling air through said generator.

3. In a wind driven generator, the combination of a hollow head member having a hollow vertical spindle connected thereto, a generator mounted on said head member, said generator having a substantially closed casing communicating with the interior of said head, and a wind operated ejector for drawing cooling air through said hollow spindle, said head and said generator casing.

4. In a wind driven generator, the combination of a mount, a hollow spindle therefor, a generator mounted on said mount, said generator having a substantially closed casing communicating with said spindle, and a wind operated ejector for drawing cooling air through said spindle and said generator casing.

5. In a generator, a casing therefor having an air inlet on one side thereof and a cooling duct leading therefrom at the other side thereof, said duct terminating in a nozzle, and a venturi mounted on said casing and substantially surrounding said nozzle, the latter discharging into said venturi.

6. In a generator, a casing therefor having an air inlet, a cooling duct leading from said casing, a venturi mounted on said casing, said duct being adapted to discharge into said venturi, a pivotal mount for said generator, and a tail vane on said mount for holding said generator and venturi into the wind.

7. In a generator, a casing therefor having an air inlet, a cooling duct leading from said casing, said duct being adapted to discharge into said venturi, and a tail vane operatively connected to hold said venturi into the wind.

8. In a generator, a casing therefor having an air inlet, a cooling duct leading from said casing, said duct having an outlet adapted to discharge air in the direction of the wind, and a tail vane operatively connected to direct said outlet in the direction of the wind.

9. In combination, a rotatably mounted head, a wind driven propeller mounted on the head, a generator casing mounted on the head for movement therewith, a generator within said casing, driving connections between the generator and the propeller, and means for holding the propeller in the wind, said casing having an air inlet opening in its lower portion and an air outlet opening in its upper portion directed to trail in the wind for causing cooling air to be induced through the casing.

10. In combination, a rotatably mounted head, a wind driven propeller mounted on the head, a generator casing mounted on the head for movement therewith, a generator within said casing, driving connections between the generator and the propeller, means for holding the propeller in the wind, the casing having an air inlet opening in its lower portion, and an air discharge pipe extending beyond the upper portion of the generator casing radially thereof and disposed to trail in the wind.

11. In combination, a rotatably mounted head, a wind driven propeller mounted on the head, a generator casing mounted on the head for movement therewith, a generator within said casing, driving connections between the propeller and the generator, means for holding the propeller in the wind, and a tubular spindle depending from the head and communicating at its upper end with the generator casing at the lower portion thereof, said casing having an air outlet opening in its upper portion disposed to trail in the wind.

12. In wind driven generating means, a generator having a casing provided with a shielded air inlet opening and with an air outlet opening disposed to trail in the wind for the eduction of air therethrough.

13. In wind driven generating means, a generator having a casing provided with a downwardly directed air inlet opening and with an air outlet opening disposed to trail in the wind for the eduction of air therethrough.

14. In wind driven generating means, a generator having a casing provided in its lower portion with an air inlet opening, said casing being provided in its upper portion with an air outlet opening disposed to trail in the wind for the eduction of air therethrough.

15. In wind driven generating means, a generator having a casing provided in its bottom wall with a downwardly directed air inlet opening, such casing having an air outlet opening in its upper portion disposed to trail in the wind for the eduction of air therethrough.

16. In combination in wind driven generating means, a wind operated propeller, a generator driven by the propeller, a casing enclosing the generator, and a tail vane for holding the propeller in the wind, said casing having a shielded air inlet opening and an air outlet opening, said openings being disposed to cause circulation of air through the casing by the action of the wind for ventilating purposes.

17. In combination in wind driven generating means, a wind operated propeller, a generator driven by the propeller, a casing enclosing the generator, and a tail vane for holding the propeller in the wind, said casing having an air inlet opening and an air outlet opening, said openings being disposed to cause circulation of air through the casing by the action of the wind for ventilating purposes.

In witness whereof, I hereunto subscribe my name this 24th day of December, 1925.

HERBERT E. BUCKLEN.